United States Patent
Groover et al.

(10) Patent No.: US 10,078,507 B2
(45) Date of Patent: *Sep. 18, 2018

(54) CLOUD INFRASTRUCTURE FOR REDUCING STORAGE FACILITY CODE LOAD SUSPEND RATE BY REDUNDANCY CHECK

(71) Applicant: International Business Machines Corporation, Armonk, NY (US)

(72) Inventors: Michael P. Groover, Vail, AZ (US); Robin Han, Lincoln, CA (US); Edward H. Lin, Tucson, AZ (US); Yan Su, Zhejiang (CN); Wei Tang, Shanghai (CN); Ming Zhi Zhao, Shanghai (CN); Yi Zhou, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,354

(22) Filed: Feb. 25, 2016

(65) Prior Publication Data

US 2016/0170737 A1    Jun. 16, 2016

Related U.S. Application Data

(63) Continuation of application No. 14/281,576, filed on May 19, 2014, now Pat. No. 9,286,056.

(51) Int. Cl.
*G06F 11/00* (2006.01)
*G06F 1/32* (2006.01)
(Continued)

(52) U.S. Cl.
CPC . *G06F 8/65* (2013.01); *G06F 8/71* (2013.01)

(58) Field of Classification Search
CPC ... G06F 8/65; G06F 8/60; G06F 8/443; G06F 8/71; G06F 8/17; G06F 1/3203;
(Continued)

(56) References Cited

U.S. PATENT DOCUMENTS 6,470,073 B1    10/2002    Fish et al.
6,647,472 B2 *  11/2003    Atkinson .............. G06F 1/3203
                                                         711/158

(Continued)

FOREIGN PATENT DOCUMENTS

EP    2 428 896 A1    3/2012

OTHER PUBLICATIONS

Vieira et al., Reducing Costs in Cloud Application Execution Using Redundancy-Based Scheduling, Dec. 2014, 10 pages.*

(Continued)

*Primary Examiner* — Thuy Dao
(74) *Attorney, Agent, or Firm* — Janaki K. Davda; Konrad Raynes Davda & Victor LLP (57) ABSTRACT

Provided are techniques for code load processing. While performing code load processing of a set of modules of a same module type, it is determined that a first module in the set of modules is not in an operational state. It is determined that a second module is a redundant module for the first module. In response to determining that the second module is in an operational state and has already completed code update, the code load processing is continued. In response to determining that the second module is in an operational state and has not already completed code update, it is determined whether there is a third redundant module that is in an operational state. In response to determining that there is a third redundant module that is in an operational state, the code load processing is continued.

4 Claims, 8 Drawing Sheets

(51) Int. Cl.
*G06F 8/65* (2018.01)
*G06F 8/71* (2018.01)

(58) Field of Classification Search
CPC . G06F 1/3209; G06F 1/3221; Y02B 60/1246;
Y02B 60/32
See application file for complete search history.

(56) References Cited

U.S. PATENT DOCUMENTS

| | | | |
|---|---|---|---|
| 6,934,805 B2 | 8/2005 | Hickman et al. | |
| 7,051,326 B2 | 5/2006 | Goodman | |
| 7,134,011 B2* | 11/2006 | Fung | G06F 1/3203 713/100 |
| 7,478,263 B1 | 1/2009 | Kownacki et al. | |
| 7,484,111 B2* | 1/2009 | Fung | G06F 1/3203 713/320 |
| 7,661,018 B2 | 2/2010 | Brundidge et al. | |
| 7,856,572 B2 | 12/2010 | Kami et al. | |
| 7,958,210 B2* | 6/2011 | Sakurai | G06F 8/65 709/220 |
| 8,020,016 B2* | 9/2011 | Hatasaki | G06F 1/3215 713/300 |
| 8,225,323 B2* | 7/2012 | Nakao | G06F 1/3203 713/1 |
| 8,245,101 B2 | 8/2012 | Olbrich et al. | |
| 8,505,004 B2 | 8/2013 | Burke, Jr. | |
| 8,751,836 B1 | 6/2014 | Piszczek et al. | |
| 8,811,188 B1* | 8/2014 | Bagchi | H04L 9/0822 370/241 |
| 8,938,633 B2 | 1/2015 | Dutton et al. | |
| 8,954,784 B2 | 2/2015 | Bower, III et al. | |
| 9,098,376 B2* | 8/2015 | Resch | G06F 8/65 |
| 9,148,465 B2 | 9/2015 | Gambardella et al. | |
| 9,189,221 B2 | 11/2015 | Ingle et al. | |
| 9,195,448 B2* | 11/2015 | Brant | G06F 8/61 |
| 9,286,056 B2* | 3/2016 | Groover | G06F 8/65 |
| 9,292,060 B1* | 3/2016 | Marr | G06F 1/3203 |
| 9,311,071 B2 | 4/2016 | Tan et al. | |
| 9,335,954 B2 | 5/2016 | Bartling et al. | |
| 9,348,391 B1* | 5/2016 | Marr | G06F 1/3203 |
| 9,378,035 B2 | 6/2016 | Kripalani | |
| 9,483,248 B2 | 11/2016 | Ramasamy | |
| 9,557,938 B2* | 1/2017 | Slik | G06F 3/0652 |
| 9,557,984 B2* | 1/2017 | Groover | G06F 8/65 |
| 9,645,811 B2 | 5/2017 | Carlen et al. | |
| 9,703,490 B2 | 7/2017 | Xu et al. | |
| 9,733,697 B2* | 8/2017 | Boss | G06F 1/3296 |
| 9,804,901 B2 | 10/2017 | Gambardella et al. | |
| 2002/0073413 A1 | 6/2002 | Goodman | |
| 2002/0138782 A1 | 9/2002 | Durrant et al. | |
| 2006/0248358 A1* | 11/2006 | Fung | G06F 1/3203 713/300 |
| 2008/0184229 A1 | 7/2008 | Rosu et al. | |
| 2009/0280907 A1 | 11/2009 | Larsen et al. | |
| 2012/0151248 A1* | 6/2012 | Bower, III | G06F 1/3203 714/4.11 |
| 2012/0317466 A1 | 12/2012 | Lu | |
| 2014/0259005 A1 | 9/2014 | Jeffrey et al. | |
| 2014/0282586 A1 | 9/2014 | Shear et al. | |
| 2014/0304398 A1 | 10/2014 | Carlen et al. | |
| 2015/0331687 A1 | 11/2015 | Groover et al. | |
| 2016/0092205 A1* | 3/2016 | Seovic | G06F 8/68 717/170 |
| 2016/0188319 A1 | 6/2016 | Groover et al. | |

OTHER PUBLICATIONS

Biondi et al., Resource reservation for real-time self-suspending tasks: theory and practice, Nov. 2015, 10 pages.*
F. Khomh, On improving the dependability of cloud applications with fault-tolerance, Apr. 2014, 3 pages.*
Mao et al., Read-Performance Optimization for Deduplication-Based Storage Systems in the Cloud, Mar. 2014, 22 pages.*
Wang et al., Efficient task replication for fast response times in parallel computation, Jun. 2014, 2 pages.*
Alves et al., Design of a backup network for catastrophe scenarios, Jun. 2009, 5 pages.*
M. Sullivan, et al., "Using Write Protected Data Structures to Improve Software Fault Tolerance in Highly Available Database Systems", 1991, Department of Electrical Engineering and Computer Sciences University of California, 10 pp.
Mell, P. and T. Grance, "Effectively and Securely Using the Cloud Computing Paradigm", NIST, Information Technology Laboratory, Oct. 7, 2009, 80 pp.
Mell, P. and T. Grange, "The NIST Definition of Cloud Computing (Draft)", National Institute of Standards and Technology, Jan. 2011, 7 pp.
IBM Europe, "IBM Power Systems feature new enterprise and HMC enhancements", Oct. 2013, 16 pp.
IBM, "System StorageDS4000 Problem Determination Guide", 2006, 242 pp.
Office Action dated Jul. 13, 2015, pp. 10, for U.S. Appl. No. 14/281,576, filed May 19, 2014.
Response dated Oct. 13, 2015, pp. 13, to Office Action dated Jul. 13, 2015, pp. 10, for U.S. Appl. No. 14/281,576, filed May 19, 2014.
Notice of Allowance dated Nov. 25, 2015, pp. 8, for U.S. Appl. No. 14/281,576, filed May 19, 2014.
List of IBM Patents or Patent Applications Treated as Related dated Mar. 8, 2016, pp. 2.
U.S. Appl. No. 15/064,104, filed Mar. 8, 2016, pp. 32.
Preliminary Amendment dated Mar. 8, 2016, pp. 8, for U.S. Appl. No. 15/064,104, filed Mar. 8, 2016.
Ex Parte Quayle, dated Sep. 27, 2017, pp. 11, for U.S. Appl. No. 15/064,104, filed Mar. 8, 2016.
Amendment, dated Nov. 1, 2017, pp. 7, to Ex Parte Quayle dated Sep. 27, 2017, pp. 11, for U.S. Appl. No. 15/064,104, filed Mar. 8, 2016.
Notice of Allowance dated Dec. 8, 2017, pp. 16, for U.S. Appl. No. 15/064,104, filed Mar. 8, 2016.
Rajagopalan et al., "Pico Replication: a High Availability Framework for Middleboxes", Oct. 2013, pp. 15.
Spilner, et al., "PICav: Precise, Iterative, and Complement-Based Cloud Storage Availability Calculation Scheme", Dec. 2014, pp. 8.
Vulimiri et al., "More is Less: reducing Latency via Redundancy", Oct. 20, 2012, pp. 6.
Lopez, et al., "Failover and Takeover Contigency Mechanisms for Network Partition and Node Failure", Sep. 2012, pp. 10.
Notice of Allowance dated Mar. 30, 2018, pp. 11, for U.S. Appl. No. 15/064,104, filed Mar. 8, 2016.

* cited by examiner

CLOUD INFRASTRUCTURE FOR REDUCING STORAGE FACILITY CODE LOAD SUSPEND RATE BY REDUNDANCY CHECK

CROSS-REFERENCE TO RELATED APPLICATIONS

This application is a continuing application of and claims the benefit of Parent application Ser. No. 14/281,576, filed on May 19, 2014, which issued as U.S. Pat. No. 9,286,056, on Mar. 15, 2016, which is incorporated by reference herein in its entirety.

FIELD

Embodiments of the invention relate to reducing storage facility code load suspend rate by redundancy check.

BACKGROUND

In current data storage facility, such as storage servers, storage systems (or storage subsystems) and components require firmware updates. The process is commonly referred to as code load or code update. During that process, multiple components' firmware may require update. The code load process is usually performed when the component is in good operational condition. Therefore, before the code load, a set of pre-checks are run to ensure that the components are in good operational state.

Since there are multiple components involved, each component has its own pre-check. For example, if the code load process determined that it is going to update the storage controller, the disk enclosure, and the disks, then, the code load process will run the pre-check for each of these components before updating that component. However, if the pre-check fails for one component, such as the storage controller, then the entire code load process is suspended. Any components remaining to be updated are not updated. Here, "component" may not mean a single module, but a type of module in the storage system (e.g., all the disk enclosures in the storage system).

Traditional pre-check is conservative. When the pre-check finds a problematic module, the entire code load task will be suspended to prevent further damage to the storage systems. This technique is widely used in field because: (1) it is a widely accepted field support guideline that the engineers should repair the problematic module first, then perform code load to the storage systems; and (2) sometimes, the high level code load process cannot skip some of the modules and still update the rest of modules (otherwise, the code load becomes non-concurrent which means host access is interrupted). That is, the code load process can "update all the modules of a certain type" or "does not update any modules of a certain type".

In some cases, a module may have a redundant module, and the redundant module may also need update. If the code load is not suspended, the redundant module may be reset during update, so the host access to the storage system is interrupted, which is a serious event in field.

Some customers are complaining that the suspend rate of code load is too high. And when the code load suspends due to hardware problems, the engineers need to order a new module, replace the old module, and then restart code load again. If this happens during a service window, the engineer can do nothing until the arrival of the new module. Usually, this means customers have to rearrange another service window for the code load.

SUMMARY

Provided is a method for code load processing. The method comprises: while performing code load processing of a set of modules of a same module type, determining that a first module in the set of modules is not in an operational state; determining that a second module is a redundant module for the first module; in response to determining that the second module is in an operational state and has already completed code update, continuing the code load processing; in response to determining that the second module is in an operational state and has not already completed code update, determining whether there is a third redundant module that is in an operational state; and, in response to determining that there is a third redundant module that is in an operational state, continuing the code load processing.

Provided is a computer system for code load processing. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: while performing code load processing of a set of modules of a same module type, determining that a first module in the set of modules is not in an operational state; determining that a second module is a redundant module for the first module; in response to determining that the second module is in an operational state and has already completed code update, continuing the code load processing; in response to determining that the second module is in an operational state and has not already completed code update, determining whether there is a third redundant module that is in an operational state; and, in response to determining that there is a third redundant module that is in an operational state, continuing the code load processing.

Provided is computer program product for code load processing. The computer program product comprises a computer readable storage medium having program code embodied therewith, the program code executable by at least one processor to perform: while performing code load processing of a set of modules of a same module type, determining that a first module in the set of modules is not in an operational state; determining that a second module is a redundant module for the first module; in response to determining that the second module is in an operational state and has already completed code update, continuing the code load processing; in response to determining that the second module is in an operational state and has not already completed code update, determining whether there is a third redundant module that is in an operational state; and, in response to determining that there is a third redundant module that is in an operational state, continuing the code load processing.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
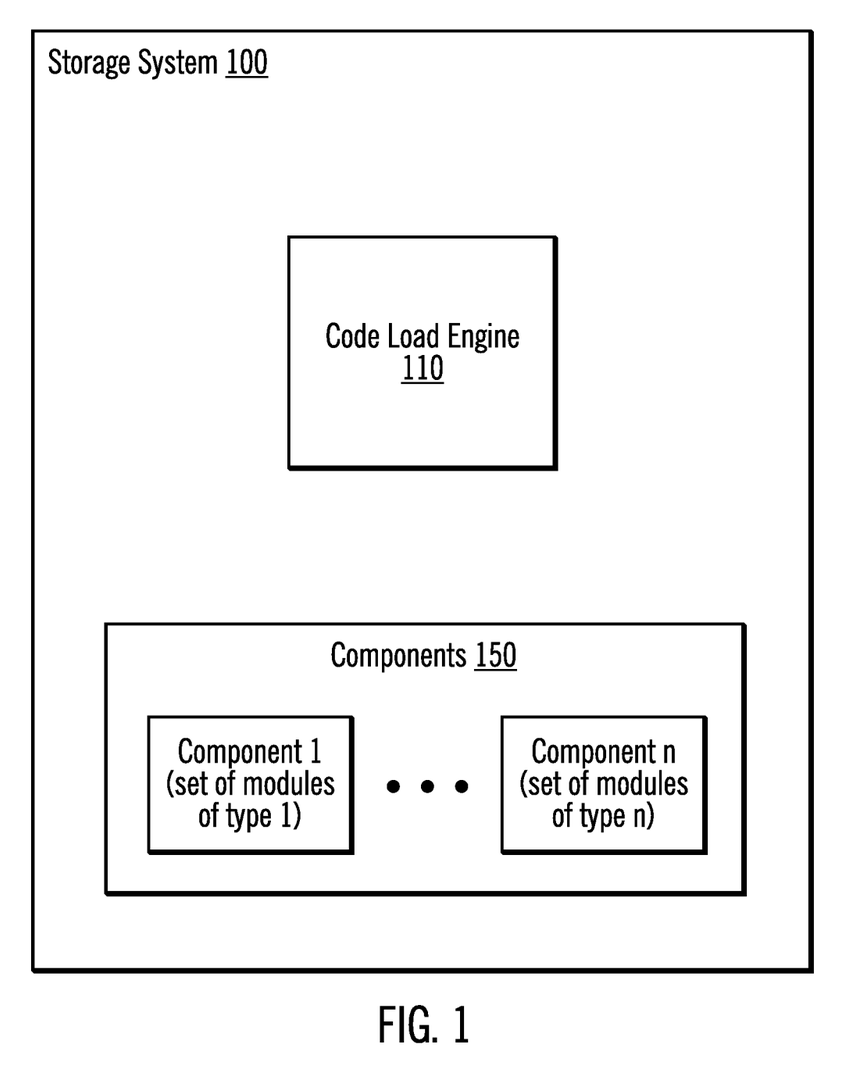
FIG. 1 illustrates, in a block diagram, a computing environment in accordance with certain embodiments.

FIG. 1 illustrates, in a block diagram, a computing environment in accordance with certain embodiments. A storage system 100 includes a code load engine 110. In certain embodiments, the storage system 100 is a storage server. The storage system 100 includes components 150, which include component 1 . . . component n (where the ellipses are used to indicate that there may be any number of components). Each component is a type of module and represents all modules of that type. For example, component 1 represents a set of modules of type 1, while component n represents a set of modules of type n. Examples of components include disk enclosures, the storage controller, host adapters, power supply units, etc. In certain embodiments, a set of modules may include one or more modules.

The code load engine 110 provides a new pre-check technique to suspend the code load when a potential host access interruption exists and to continue the code load when such a potential host access interruption does not exist. That is, the code load process can continue if there is at least one redundant module that will not cause a host interruption.

During pre-check, when the code load engine 110 finds a problematic module, instead of suspending the code load process immediately, the code load engine 110 will identify the redundant modules of the problematic module. In certain embodiments, the code load engine 110 tries to find a redundant module that meets at least one of the following two criteria:

(1) Is a selected redundant module in an operational state and has already completed its code update?

(2) Is the selected redundant module in an operational state (but has not already completed its code update) and there is an additional redundant module that is in an operational state (but may not have already completed its code update)?

With the first criterion, if there is at least one redundant module working, and it has already been updated, the code load engine 110 knows that this one redundant module will not be taken off-line or reset in the remaining code load process and continues the code load process without disrupting the storage system service. With the second criterion, since the code load engine 110 is updating the all modules of a same type at one at a time, any one of the redundant modules may be relied on to continue code load processing. For example, assume that there are three redundant modules: 1) module A that has a problem, 2) module B, and 3) module C. After determining that module A has a problem, if the code load engine 110 finds module B passes the first criterion (which means that module B is working and already update and will not need to be taken offline and reset), then code load processing can continue. Alternatively, if the code load engine 110 finds module B is in an operational state (but has not already completed its code update) and also finds module C is operational (but may not have already completed its code update), then, the code load processing can still continue, regardless of both firmware levels of modules B and C because module C may be used when module B is taken offline for code update and module B may be used when module C is taken offline for code update. In certain embodiments, the code load engine 110 may determine whether a redundant module has been updated by comparing the currently running firmware version of the redundant module and the updated firmware version contained in a code load package for the redundant module. A code load package may be described as including firmware updates for each type of module. The code load process continues if there is at least one redundant module that satisfies this criterion. In certain embodiments, the code load engine 110 keeps track of how many modules of a type there are and indicates for each one, whether that module is in an operational state. Thus, if a module fails, it is marked as not being in an operational state (i.e., not operational). Using this information, the code load engine 110 is able to determine whether one redundant module has an additional redundant module that is in an operational state (regardless of whether its code is already updated or not). The code load engine 110 also keeps track of which modules have been updated as the update occurs.

Thus, if criterion (1) is satisfied and/or criterion (2) is satisfied, code load processing continues. If neither criterion (1) nor criterion (2) is satisfied, then code load processing is suspended.

Merely to enhance understanding, an example will be provided using host adapters (which may be described as adapters that connect the storage system to external servers). Embodiments are also applicable to other modules in the storage system.

Figure 2:
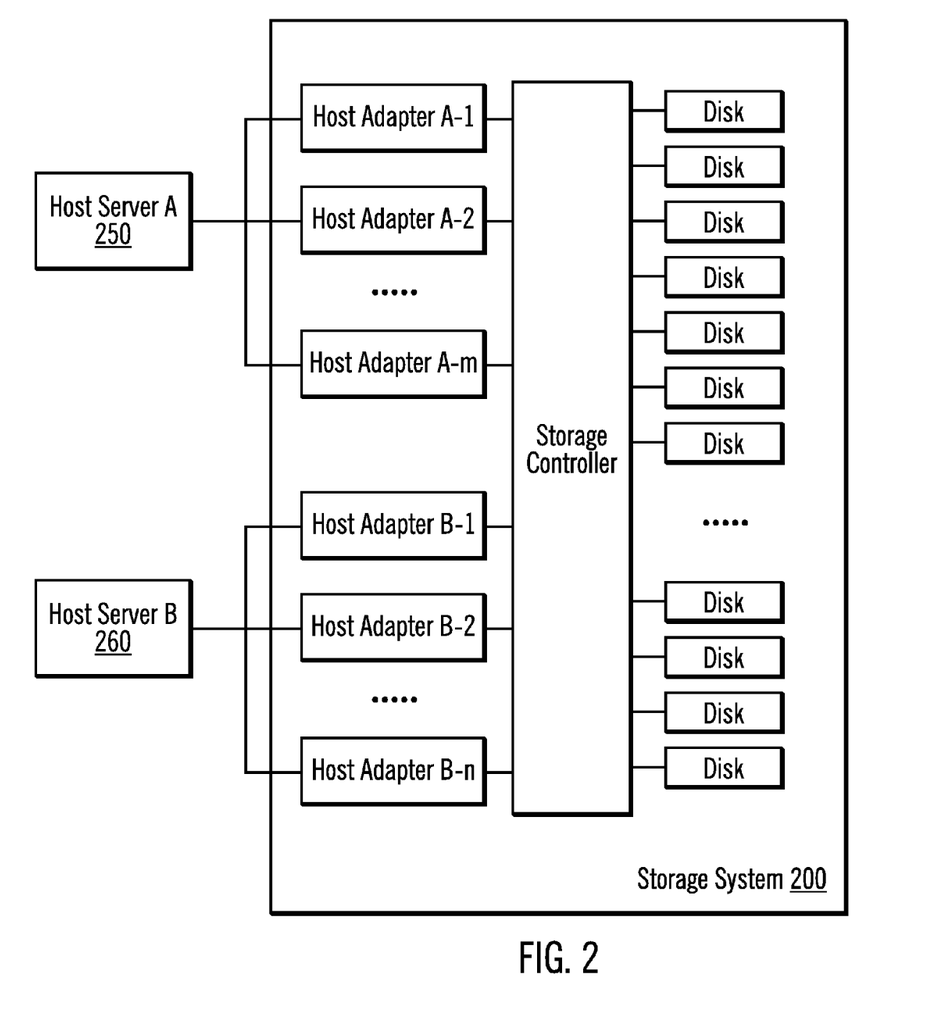
FIG. 2 illustrates an example of host adapters in accordance with certain embodiments.

FIG. 2 illustrates an example of components in a storage system 200 in accordance with certain embodiments. The components represent three types of modules: 1) the host adapters, 2) the storage controller, and 3) the disks and the disk enclosures. The host adapters connect the storage system 200 to external host servers 250, 260 that may be referred to as hosts. In order to achieve robustness, more than one host adapter is connected to a single host server 250, 260 so that even if one of the host adapters fails, the host server 250, 260 may still access the storage system 200 through other host adapters.

In FIG. 2, there are m host adapters (A-1 to A-m) connecting to host server A 250. There are n host adapters (B-1 to B-n) connecting to host server B 260.

When the code load engine 110 begins a host adapter update, the code load engine 110 will first launch the host adapter update pre-check.

Suppose host adapter A-1 fails the pre-check, in a traditional method, the entire code load process is suspended, and the engineer will repair A-1 or order a new host adapter to replace A-1. The code load process is resumed after A-1 returns to normal state or replaced by a new host adapter.

With embodiments, the code load engine 110 analyzes the potential host interruption in the remaining operations of the code load. If there is such a potential, the code load engine 110 suspends the code load processing, otherwise, the code load engine 110 safely continues the code load processing. Then, the problematic host adapter is skipped or failed during the update. After the code load processing completes, the problematic host adapter is repaired or replaced, and its firmware is updated.

Figure 3A:
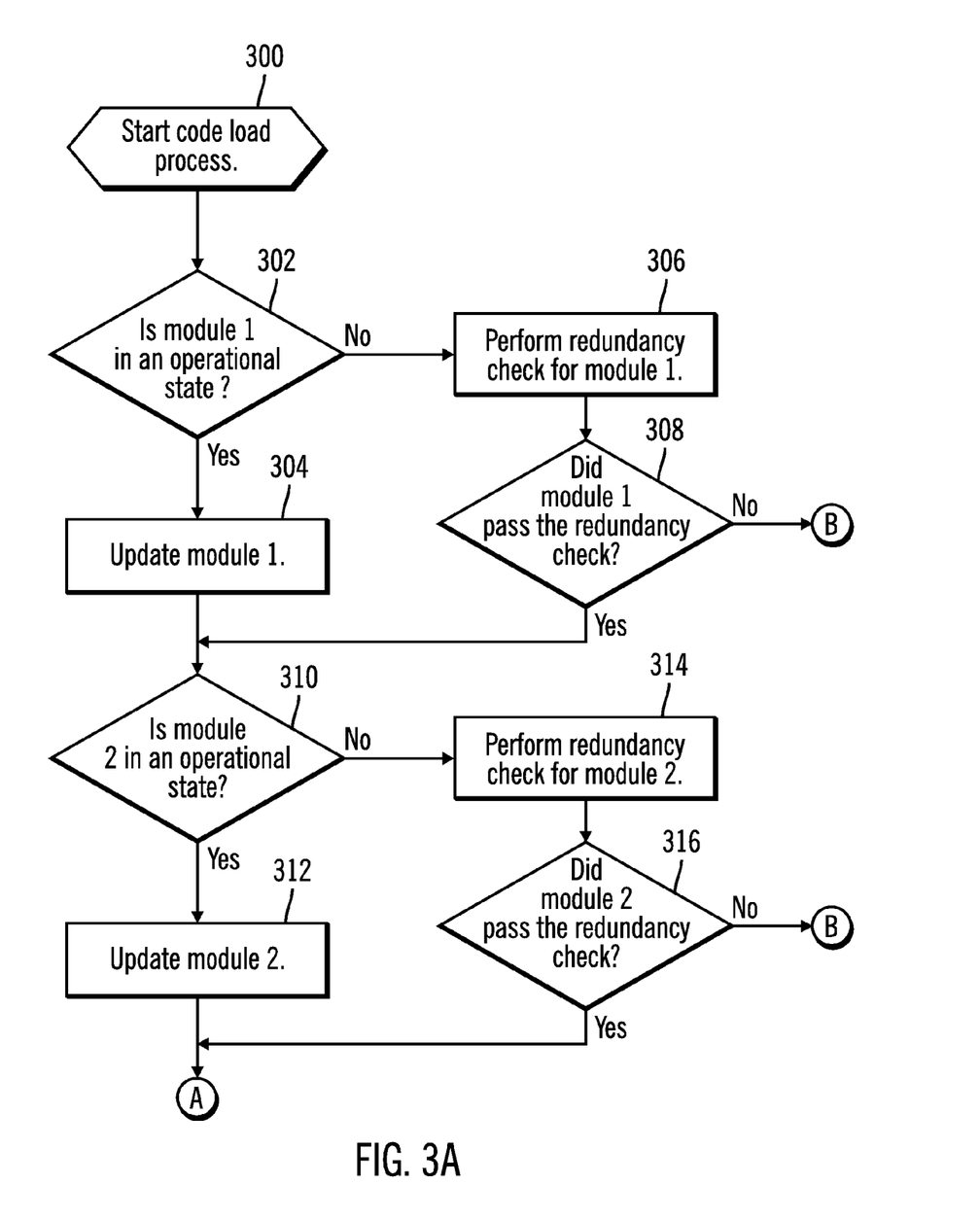
FIGS. 3A and 3B illustrate, in a flow diagram, operations for a pre-check in accordance with certain embodiments.
Figure 3B:
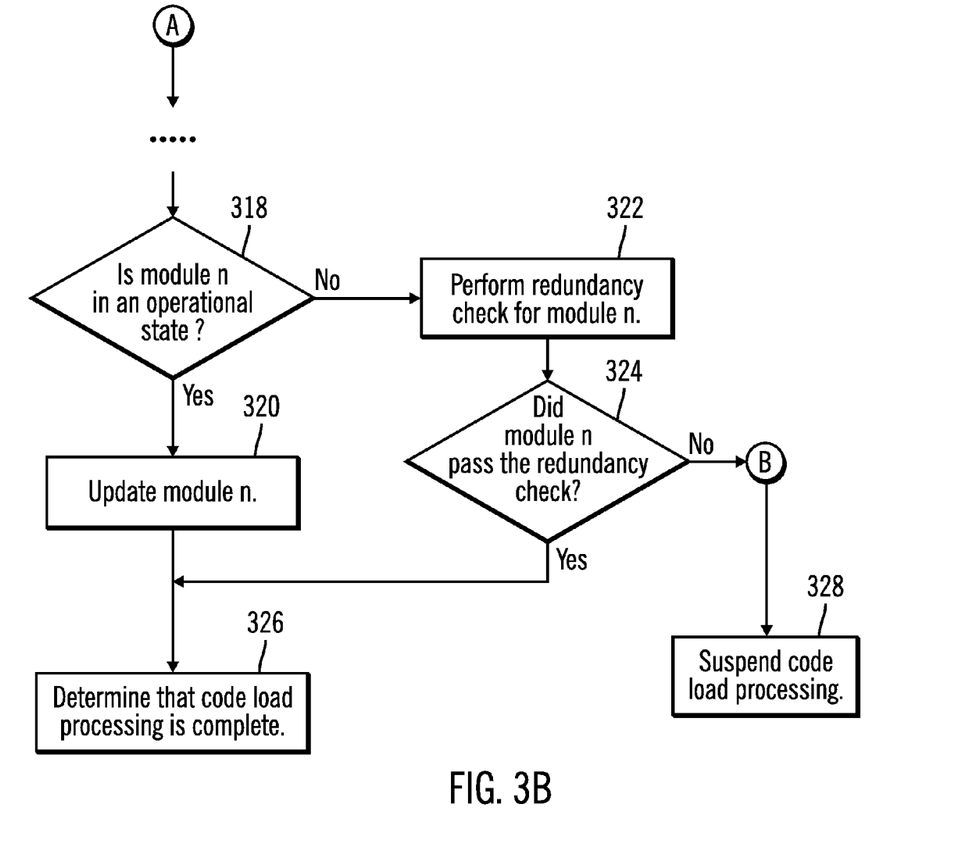

FIGS. 3A and 3B illustrate, in a flow diagram, operations for a pre-check in accordance with certain embodiments. Control begins at block 300 with the code load engine 110 starting code load processing for modules 1-n. In block 302, the code load engine 110 determines whether module 1 is in an operational state (e.g., "normal" or "functioning properly"). If so, processing continues to block 304, otherwise, processing continues to block 306. In block 304, the code load engine 110 updates module 1 and processing continues to block 310. In block 306, the code load engine 110 performs a redundancy check for module 1. In block 308, the code load engine 110 determines whether module 1 passed the redundancy check. If so, processing continues to block 310, otherwise, processing continues to block 328 (FIG. 3B).

In block 310, the code load engine 110 determines whether module 2 is in an operational state (e.g., "normal" or "functioning properly"). If so, processing continues to block 312, otherwise, processing continues to block 314. In block 312, the code load engine 110 updates module 2 and processing continues to FIG. 3B. In block 314, the code load engine 110 performs a redundancy check for module 2. In block 316, the code load engine 110 determines whether module 2 passed the redundancy check. If so, processing continues to FIG. 3B, otherwise, processing continues to block 328 (FIG. 3B).

In FIG. 3B, the ellipses the processing for other modules (which would be, for example, the processing of blocks 302-308).

In block 318, the code load engine 110 determines whether module n is in an operational state (e.g., "normal" or "functioning properly"). If so, processing continues to block 320, otherwise, processing continues to block 322. In block 320, the code load engine 110 updates module n and processing continues to block 326. In block 322, the code load engine 110 performs a redundancy check for module n. In block 324, the code load engine 110 determines whether module n passed the redundancy check. If so, processing continues to block 326, otherwise, processing continues to block 328.

In block 326, the code load engine 110 determines that the code load processing is complete. In block 328, the code load engine 110 suspends the code load processing.

Returning to the example of FIG. 2, suppose host adapter A-1 fails the pre-check. Then, the code load engine 110 will go through the other host adapters connecting to host server A, and try to find a host adapter that passes the redundancy check. That is, the code load engine 110 tries to find a redundant host adapter that meets at least one of the following two criteria:

1) Is there a redundant host adapter is in an operational state and has already completed its code update?

2) Is there a redundant host adapter that is in an operational state (but that has not already completed its code update) and is there another redundant host adapter that is in an operational state (but may not have already completed its code update)?

The first criterion ensures that this host adapter will not be reset during the remaining operations of the code load process, so host interruption will not happen. The second criterion ensures that, even if this host adapter is not in an operational state, if there is another redundant module that has yet to be checked, the code load process may continue. In certain embodiments, code load process may query the current running firmware version of the host adapter, and compare that current running firmware version with the host adapter firmware version in the code load package. If these two versions are equal, then the host adapter firmware will not be updated in the remaining of this code load process, and the code load can continue. If these two versions are not equal, the host adapter is not updated, but, if there is another redundant host adapter, the code load process continues.

Figure 4:
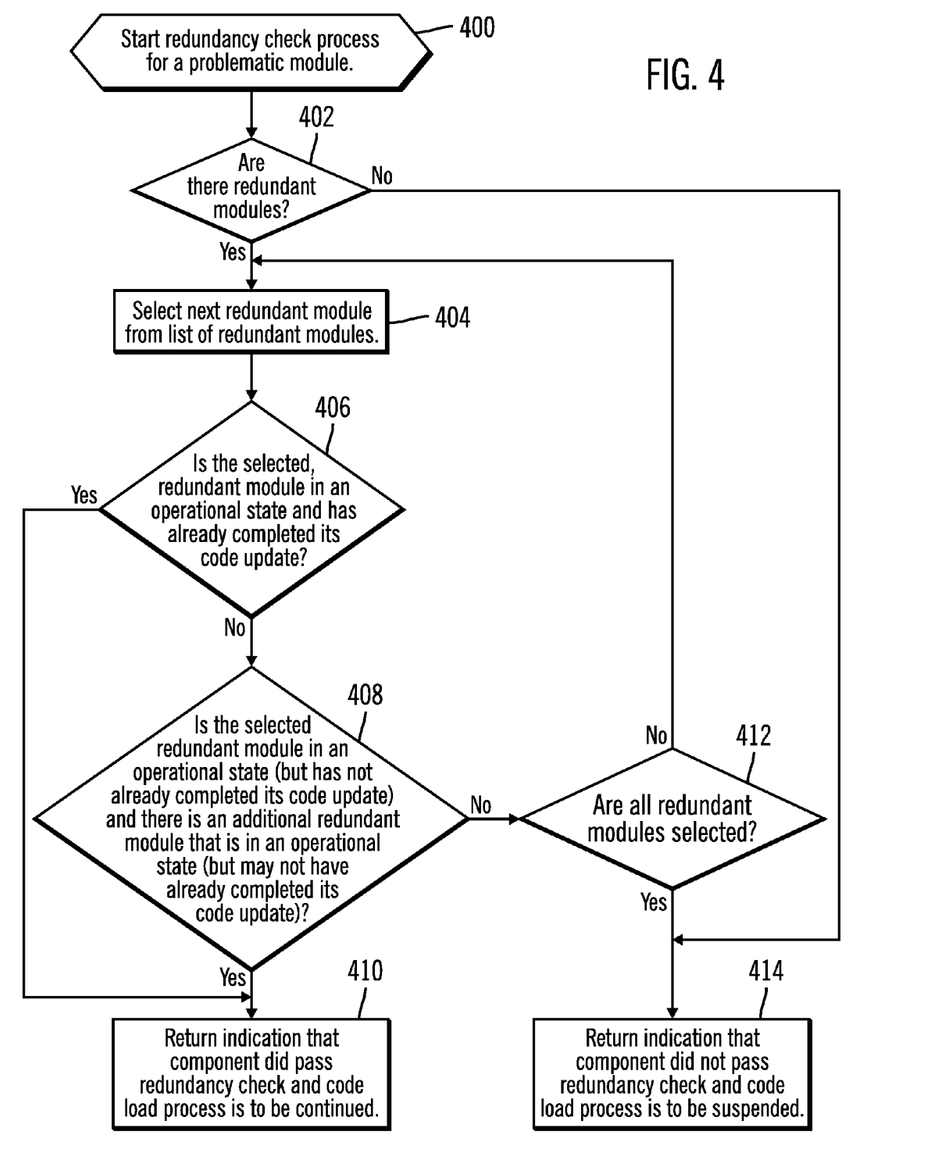
FIG. 4 illustrates, in a flow diagram, operations for a redundancy check in accordance with certain embodiments.

FIG. 4 illustrates, in a flow diagram, operations for a redundancy check in accordance with certain embodiments. Control begins at block 400 with the code load engine 110 starting a redundancy check process for a problematic module. In block 402, the code load engine 110 determines whether there are redundant modules. If so, processing continues to block 404, otherwise, processing continues to block 414.

In block 404, the code load engine 110 selects a next redundant module from a list of redundant modules (starting with a first redundancy module from the list). In block 406, the code load engine 110 determines whether the selected, redundant module is in an operational state (e.g., "normal" or "functioning properly") and has already completed its code update. If so, processing continues to block 410, otherwise, processing continues to block 408.

In block 408, the code load engine 110 determines whether the selected redundant module is in an operational state (but has not already completed its code update) and there is an additional redundant module that is in an operational state (but may not have already completed its code update). If so, processing continues to block 410, otherwise, processing continues to block 412.

In block 410, the code load engine 110 returns an indication that the component did pass the redundancy check and that the code load process is to be continued.

In block 412, the code load engine 110 determines whether all redundant modules have been selected. If so, processing continues to block 414, otherwise, processing continues to block 404.

In block 412, the code load engine 110 returns an indication that the component did not pass the redundancy check and that the code load process is to be suspended.

With embodiments, the code load process may continue if there is at least one redundant module that can sustain the system concurrency for the remaining code load process. For example, if a system component is being updated that has redundant paths on module A, module B, and module C, and the update occurs on these modules in a sequential order: if A failed pre-check, but B and C are both operational, the code load should continue because if either B or C or both complete the update successfully, the system can complete code load processing without losing concurrency. If A (or B or both) have already completed update successfully and in operational state, code load processing should continue even if B (or C or both) encounters problems during their pre-check or updates. If A has previously failed its pre-check or update, and B has also encountered problem during pre-check, code load processing should suspend because continuing may take the only remaining path C offline.

Thus, the code load engine 110 enables customers to finish the code load first, and then repair a problematic module, while still using pre-checks (because the high level code load process cannot skip some of the modules and still update the rest of modules).

Thus, the code load engine 110 enables the engineers to continue the code load process when potential host interruption does not exist. Embodiments may be used by customers or engineers who want to perform the code load before repairing the problematic module and make the service window time more efficient.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
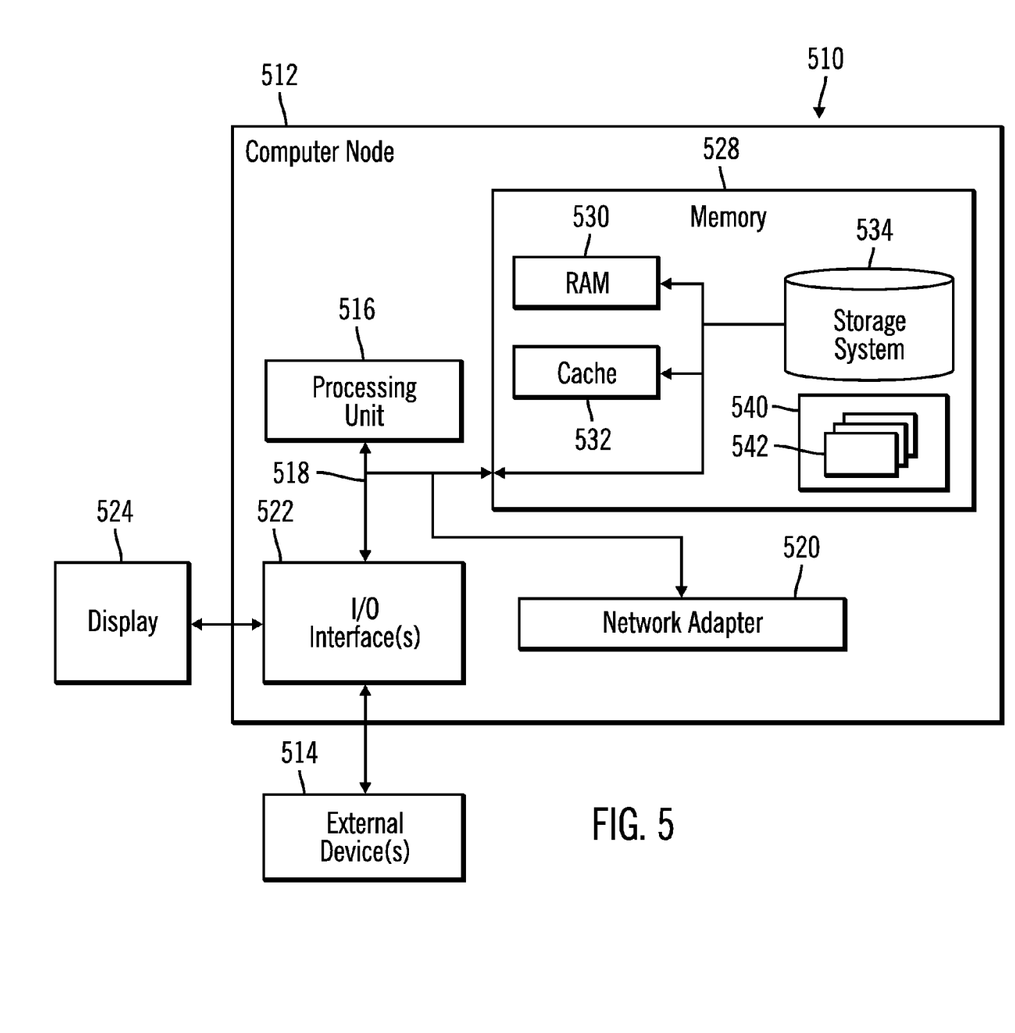
FIG. 5 illustrates a cloud computing node in accordance with certain embodiments.

Referring now to FIG. 5, a schematic of an example of a cloud computing node is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
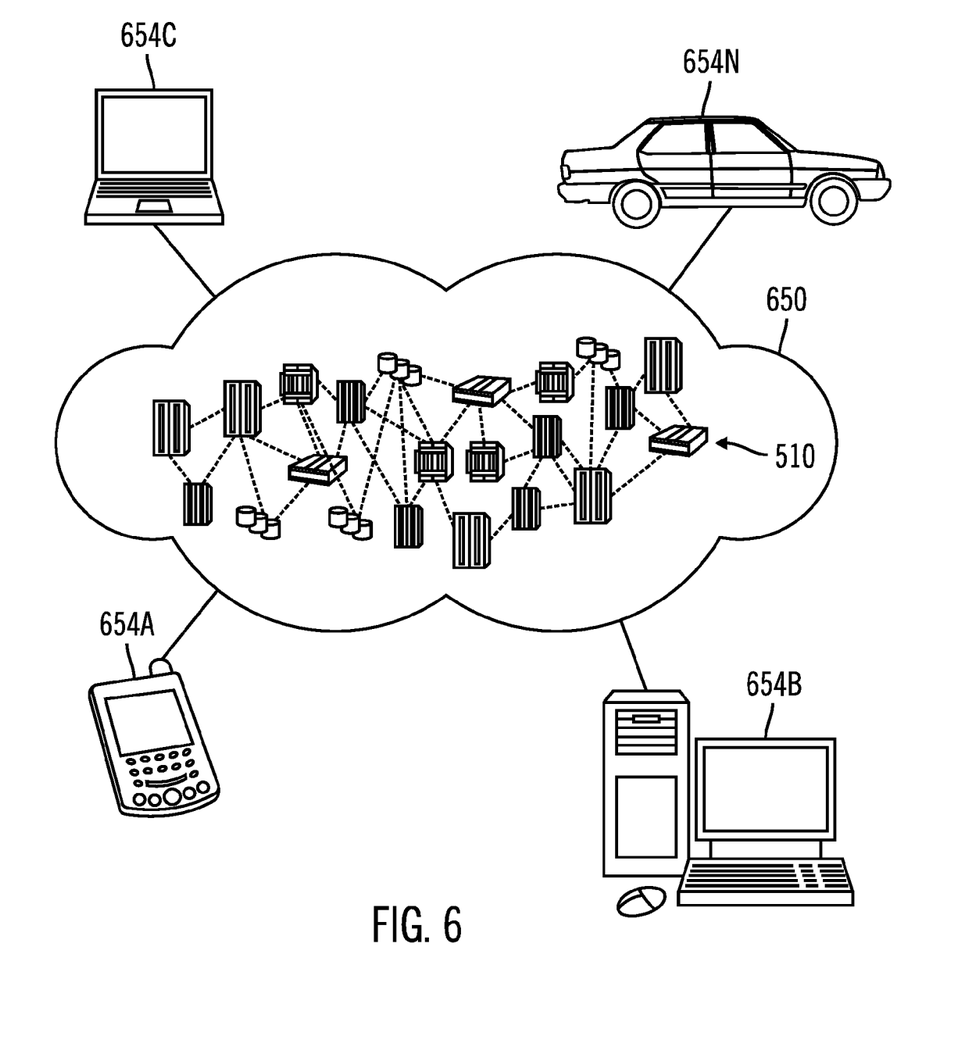
FIG. 6 illustrates a cloud computing environment in accordance with certain embodiments.

Referring now to FIG. 6, illustrative cloud computing environment 650 is depicted. As shown, cloud computing environment 650 comprises one or more cloud computing nodes 510 with which local computing devices used by cloud consumers, such as, for example, personal digital assistant (PDA) or cellular telephone 654A, desktop computer 654B, laptop computer 654C, and/or automobile computer system 654N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 510 and cloud computing environment 650 can communicate with any type of computerized device over any type of network and/or network addressable connection (e.g., using a web browser).

Figure 7:
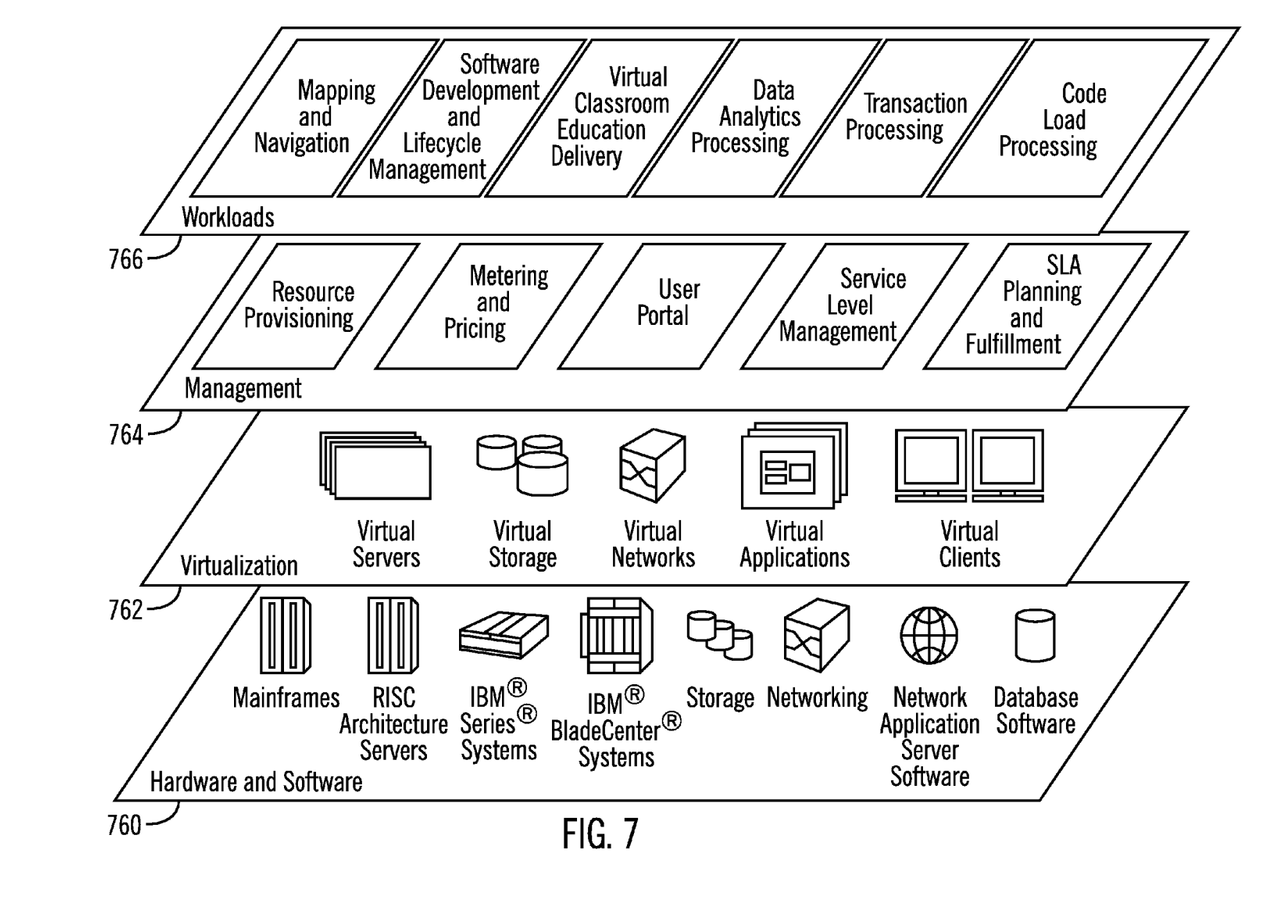
FIG. 7 illustrates abstraction model layers in accordance with certain embodiments.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and code load processing.

Thus, in certain embodiments, software or a program, implementing code load processing in accordance with embodiments described herein, is provided as a service in a cloud environment.

In certain embodiments, the storage system 100 has the architecture of computing node 510. In certain embodiments, the storage system 100 is part of a cloud environment. In certain alternative embodiments, the storage system 100 is not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A cloud system providing code load processing, comprising:
   a cloud infrastructure;
   at least one cloud computing node in the cloud infrastructure, wherein the cloud computing node includes one or more processors, one or more computer-readable memories and one or more computer-readable, tangible storage devices, and program instructions, stored on at least one of the one or more computer-readable, tangible storage devices of the cloud computing node for execution by at least one of the one or more processors via at least one of the one or more memories, the at least one cloud computing node comprising at least one set of modules, to perform operations for:
   code load processing of a set of modules of a same module type from the at least one set of modules by,
      determining that a first module in the set of modules is not in an operational state;
      in response to determining that there is at least one redundant module for the first module in the set of modules,
         determining that a second module is a redundant module for the first module;
         in response to determining that the second module is in an operational state and has already completed code update, continuing the code load processing;
         in response to determining that the second module is in the operational state and has not already completed code update, determining whether there is a third module that is another redundant module for the first module and that is in an operational state; and
         in response to determining that there is the third module that is in the operational state, continuing the code load processing; and
      in response to determining that there is no redundant module for the first module, suspending the code load processing.

2. The cloud system of claim 1, wherein the operations further comprise:
   in response to determining that the second module is in the operational state and has not already completed code update and that there is no third module that is another redundant module for the first module and that is in the operational state, suspending the code load processing.

3. The cloud system of claim 1, wherein the operations further comprise:
   in response to determining that the third module is in the operational state, updating firmware for the second module while continuing to use the third module.

4. The cloud system of claim 1, wherein the set of modules form a component.

* * * * *